Patented June 27, 1950

2,512,653

UNITED STATES PATENT OFFICE 2,512,653

PROCESS OF PREPARING $Cr_2O_3$-HYDROGENATING METAL OXIDE CATALYSTS

Alfred F. Kapecki, Chicago, Ill., assignor to The Givaudan Corporation, a corporation of New Jersey No Drawing. Application April 10, 1945, Serial No. 587,609

17 Claims. (Cl. 252—468)

This invention relates to novel catalysts and to a novel method of preparing them.

An object of this invention is to provide novel catalysts especially suitable for use in hydrogenation reactions.

Another object is to provide such catalysts in a highly porous and active form.

In a more limited aspect, an object of this invention is to provide catalysts having particular application in connection with the reduction of so-called long chain fatty acids or their derivatives to th alcohols corresponding to the fatty acids or fatty acid radicals present in the material reduced.

A still further object is to provide a simple and economical novel method of preparing the novel catalysts of this invention.

Other objects of this invention will be apparent to those skilled in the art from the following description.

The foregoing and other objects are attained according to this invention with novel catalysts prepared by heating mixtures consisting of at least one hydrogenating metal carboxylate and chromium trioxide at or above temperatures at which decomposition occurs.

In general, the method of preparing the novel catalysts of this invention involves first forming an intimate mixture of the hydrogenating metal carboxylate and chromium oxide. Satisfactory results have been obtained by grinding finely powdered ingredients (ingredients to have been passed through a 100 or 200 mesh screen) together until a substantially uniform product or composite forms. In some cases the product resulting is a viscous liquid which can be ignited while in this state by the procedure described below, without any further manipulation. In other cases either a partially wet pastry mass or a dry powdered aggregate results. In the latter cases small amounts of glacial acetic acid or acetic anhydride are added with further grinding until a viscous liquid or a semi-liquid composite is produced. In some cases, if desired, the intimate mixture may be effected by separately grinding the ingredients to fine powders and combining the powders, under shaking, followed by exposure to air until a substantially uniform viscous liquid or semi-liquid composite results. The intimate mixture is placed in a container, such as a porcelain dish, maintained at a temperature substantially above that at which decomposition occurs, e. g., about 95° C. to about 300° C. Decomposition is evidenced by noticeable liquefaction followed by foaming and ignition, which lasts for approximately fifteen seconds to about a minute. Dark, voluminous, porous products result. These may be used per se, or, if desired, they may be used after lixiviation with an aqueous solution of ammonium hydroxide and ammonium nitrate. Also, if desired, the extracted and unextracted catalysts may be subjected to the action of hydrogen at elevated temperatures, for example, at 390° C. for 3 hours.

As hydrogenating metal carboxylates which may be employed according to this invention cupric acetate, cadmium acetate and zinc acetate may be noted. If desired, carbonates of the hydrogenating metals may also be employed, provided they are mixed with a large excess of the carboxylates of the same or other hydrogenating metals.

It has been found that satisfactory catalysts may be obtained according to this invention even when the proportions of the ingredients are varied within wide limits. Thus for example, from 1 to 2 mols of hydrogenating metal carboxylate may be mixed with from 1 to 3 mols of chromium trioxide.

The catalysts are exceedingly light in weight, friable spongelike masses that are very porous. The color of the catalyst varies from a dark gray to a black mass and in some cases in interspersed with green particles which may be due to the presence of some uncombined chromium oxide $(Cr_2O_3)$.

The products of this invention are suitable for use as catalysts for different chemical purposes. For example, they are useful as hydrogenation and dehydrogenation catalysts. Advantageously, it may be noted, they have been found to be especially useful as catalysts in the reduction of fatty acids, their esters and other derivatives, to form fatty alcohols corresponding to the fatty acids or the acid radicals of the derivative reduced.

The following examples are given for purpose of illustration and are not intended to limit the invention.

EXAMPLE I

*Preparation of catalyst from zinc acetate and chromium trioxide*

A catalyst was prepared as follows: 109.75 grams (0.5 mol) of powdered zinc acetate (passed through a 200 mesh screen)

$(Zn(CH_3COO)_2.2H_2O)$ and 50 grams (0.5 mol) of powdered chromium trioxide (passed through a 200 mesh screen)

(CrO₃) were ground together with a mortar and pestle until a semi-liquid composite was formed. The composite was then dropped into a heated porcelain dish held at 250° C. The contents of the dish foamed and ignited spontaneously, leaving a dark, voluminous, porous catalytic material. After ignition was completed, the mass was removed from the dish and allowed to cool.

The mass prepared as above may be broken up into small pieces or it can be crushed and then graded to pass a #12 but retained by a #60 mesh sieve. While in this state it can be employed for catalytic purposes, or alternatively, it may be subjected to an extraction process prior to such use.

If the catalyst is extracted prior to use, the following is a suitable extraction method. The catalyst prepared above is placed in 500 cc. of an aqueous solution containing 50 grams of ammonium hydroxide and 25 grams of ammonium nitrate. The whole is stirred for thirty minutes, after which the catalyst is allowed to settle, and the supernatant liquid is decanted. A fresh supply of ammonium hydroxide-ammonium nitrate solution is added to the catalyst and the lixiviation is repeated, the supernatant liquid again being decanted. The extracted catalyst is then washed five times using 500 cc. of water in each wash. The washed catalyst is filtered and then dried for twelve hours at 100° C.

77.6 grams (before extraction) of a dark voluminous, porous product were obtained. After extraction the yield amounted to 65.6 grams.

EXAMPLE II

*Preparation of catalyst from copper acetate, zinc acetate, glacial acetic acid and chromium trioxide*

25 grams (0.125 mol) of powdered cupric acetate $(Cu(CH_3COO)_2 \cdot H_2O)$, 27.5 grams (0.125 mol) of powdered zinc acetate $(Zn(CH_3COO)_2 \cdot 2H_2O)$, 2.6 grams (2.5 ml.) of glacial acetic acid $(CH_3COOH)$ and 25 grams (0.25 mol) of powdered chromium trioxide $(CrO_3)$ were treated in accordance with Example I but ignited at 235° C.

39.2 grams (before extraction) of a dark, voluminous, porous product were obtained. After extraction the yield amounted to 33.0 grams.

EXAMPLE III

*Preparation of catalyst from cupric acetate, cadmium carbonate, zinc acetate and chromium trioxide*

45.5 grams (0.207 mol) of powdered zinc acetate $(Zn(CH_3COO)_2 \cdot 2H_2O)$, 3.22 grams (0.018 mol) of powdered cadmium carbonate $(CdCO_3)$, 4.95 grams (0.025 mol) of powdered cupric acetate $(Cu(CH_3COO)_2 \cdot H_2O)$, and 25 grams (0.25 mol) of powdered chromium trioxide $(CrO_3)$ were treated in accordance with Example I.

40 grams (before extraction) of a dark, voluminous, porous product were obtained. After extraction the yield amounted to 33 grams.

EXAMPLE IV

*Preparation of catalyst from cupric acetate glacial acetic acid and chromium trioxide*

50 grams (0.25 mol) of powdered cupric acetate $(Cu(CH_3COO)_2 \cdot H_2O)$, 10.5 grams (10 ml) of glacial acetic acid $(CH_3COOH)$ and 25 grams (0.25 mol) of powdered chromium trioxide $(CrO_3)$ were treated in accordance with Example I.

37.4 grams (before extraction) of a dark, voluminous, porous product were obtained. After extraction the yield amounted to 33.8 grams.

EXAMPLE V

*Preparation of catalyst from zinc acetate and chromium trioxide*

21.95 grams (0.1 mol) of powdered zinc acetate $(Zn(CH_3COO)_2 \cdot 2H_2O)$ and 30 grams (0.3 mol) of powdered chromium trioxide $(CrO_3)$ were treated in accordance with Example I but ignited at 215° C.

27.5 grams (before extraction) of a dark, voluminous, porous product were obtained. After extraction the yield amounted to 26.2 grams.

EXAMPLE VI

*Preparation of catalyst from zinc acetate, glacial acetic acid and chromium trioxide*

43.9 grams (0.2 mol) of powdered zinc acetate $(Zn(CH_3COO)_2 \cdot 2H_2O)$, 1.0 gram (1 cc.) glacial acetic acid $(CH_3COOH)$ and 10.0 grams (0.1 mol) of powdered chromium trioxide $(CrO_3)$ were treated in accordance with Example I.

22.5 grams (before extraction) of a dark, voluminous, porous product were obtained. After extraction the yield amounted to 15.5 grams.

EXAMPLE VII

*Preparation of catalyst from cupric acetate, glacial acetic acid and chromium trioxide*

20.0 grams (0.1 mol) of powdered cupric acetate $(Cu(CH_3COO)_2 \cdot H_2O)$, 8.4 grams (8 ml.) of glacial acetic acid and 30.0 grams (0.3 mol) of powdered chromium trioxide were treated in accordance with Example I but ignited at 150° C.

27.9 grams (before extraction) of a dark, voluminous, porous product were obtained. After extraction the yield amounted to 24.8 grams.

EXAMPLE VIII

*Preparation of catalyst from cupric acetate, glacial acetic acid and chromium trioxide*

40.0 grams (0.2 mol) of powdered cupric acetate $(Cu(CH_3COO)_2 \cdot H_2O)$, 6.3 grams (6 ml.) of glacial acetic acid and 10.0 grams (0.1 mol) of powdered chromium trioxide $(CrO_3)$ were treated in accordance with Example I but ignited at 205° C.

22.0 grams (before extraction) of a dark, voluminous, porous product were obtained. After extraction the yield amounted to 19.6 grams.

EXAMPLE IX

*Preparation of catalyst from cadmium acetate, acetic anhydride and chromium trioxide*

66.6 grams (0.25 mol) of powdered cadmium acetate $(Cd(CH_3COO)_2 \cdot 2H_2O)$, 5.4 grams (5 ml.) of acetic anhydride $((CH_3CO)_2O)$ and 25 grams of powdered chromium trioxide were treated in accordance with Example I.

49.5 grams of a dark, voluminous, porous product was obtained.

EXAMPLE X

*Reduction of fatty acids to the corresponding alcohols, using a catalyst of this invention*

180 cc. (49 grams) of the catalyst (before extraction) prepared according to Example III was loaded into a ¾″ extra heavy iron pipe size, Inconel reaction tube (copper-clad Inconel may also be employed) capable of being heated and of withstanding high pressure. The catalyst bed was 2 feet 6 inches long. The catalyst was reduced in a stream of hydrogen flowing at the rate of 15 cubic feet per hour while being held at atmospheric pressure and at a temperature of 390° C. for 3 hours. Pressure was then raised in the equipment until reactor pressure was 2,800 pounds per square inch. While at the above temperature and pressure, pure palmitic acid was pumped over the catalyst bed at the rate of 650 cc. per hour while simultaneously passing hydrogen over at a rate of 15.0 cubic feet per hour. The reactor pressure was controlled at a constant value by maintaining an adequate supply of hydrogen at pressures higher than the reactor pressure (3000–4000 pounds per square inch) and reducing this pressure to reactor pressure by means of a pressure control valve inserted between gas supply and reactor. The flow of fatty acid was held constant by means of a high pressure positive displacement pump, and the rate of hydrogen removal was controlled by manipulation of a gas expansion valve located at end of reactor system. The liquid product was separated from the vented gas by passage through a liquid separator. Then gases from the liquid separator passed through a condenser and into a second liquid separator (condenser trap) where the separation of gas and any condensed liquid was accomplished. Gas leaving the condenser trap was then exhausted through the expansion valve at the exit end of the reactor system. The exhausted gas then passed through a gas meter where it was measured while under standard conditions of pressure and temperature.

The product removed from the first trap has the following analysis:

| | |
|---|---:|
| Acid value | 2.9 |
| Saponification value | 32.6 |
| Unsaponifiable matter _____per cent__ | 82.0 |
| Hydroxyl value | 135.0 |
| Palmitic acid _____per cent__ | 1.33 |
| Cetyl palmitate _____do____ | 25.50 |
| Cetyl alcohol _____do____ | 58.50 |

If this example is repeated with 180 cc. (83.1 grams) of the catalyst (after extraction) prepared according to Example III, a product showing the following analysis was formed.

| | |
|---|---:|
| Acid value | 0.0 |
| Saponification value | 11.5 |
| Unsaponifiable matter _____per cent__ | 86.0 |
| Hydroxyl value | 172.0 |
| Palmitic acid _____per cent__ | 0.0 |
| Cetyl palmitate _____do____ | 9.86 |
| Cetyl alcohol _____do____ | 74.50 |

EXAMPLE XI

*Reduction of fatty acids to the corresponding alcohols, using a catalyst of this invention*

180 cc. (49 grams) of the catalyst (before extraction) prepared according to Example III was loaded into a 3/4" extra heavy iron pipe size, Inconel reaction tube (copper-clad Inconel may also be employed) capable of being heated and of withstanding high pressures. The catalyst bed was 2 feet 6 inches long. The catalyst was reduced in a stream of hydrogen flowing at the rate of 15 cubic feet per hour while being held at atmospheric pressure and at a temperature of 390° C. for 3 hours. Pressure was then raised in the equipment until reactor pressure was 2800 pounds per square inch. While at the above temperature and pressure, pure oleic acid was pumped over the catalyst bed at the rate of 730 cc. per hour while simultaneously passing hydrogen over at a rate of 15.0 cubic feet per hour. The reactor pressure was controlled at a constant value by maintaining an adequate supply of hydrogen at pressures higher than the reactor pressure (3000–4000 pounds per square inch) and reducing this pressure to reactor pressure by means of a pressure control valve inserted between gas supply and reactor. The flow of fatty acids was held constant by means of a high pressure positive displacement pump, and the rate of hydrogen removal was controlled by manipulation of an expansion valve located at end of reactor system. The liquid product was separated from the vented gas by passage through a liquid separator. Then gases from the liquid separator passed through a condenser and into a second liquid separator (condenser trap) where the separation of gas and any condensed liquid was accomplished. Gas leaving the condenser trap was then exhausted through the expansion valve at the exit end of the reactor system. The exhausted gas then passed through a gas meter where it was measured while under standard conditions of pressure and temperature.

The product removed continuously from the separator had the following analysis:

| | |
|---|---:|
| Acid value | 2.8 |
| Saponification value | 26.8 |
| Unsaponifiable matter _____per cent__ | 73.0 |
| Hydroxyl value | 142.5 |
| Iodine value | 43.2 |
| Fatty acid (expressed as oleic acid) _____per cent__ | 1.41 |
| Esters (expressed as oleyl oleate) _____do____ | 22.8 |
| Alcohols (expressed as oleyl alcohol) _____do____ | 68.2 |

If this example is repeated with 180 cc. (83.1 grams) of the catalyst (after extraction) prepared according to Example III, a product showing the following analysis was formed.

| | |
|---|---:|
| Acid value | 2.6 |
| Saponification value | 16.95 |
| Unsaponifiable matter _____per cent__ | 76.0 |
| Hydroxyl value | 167.0 |
| Iodine value | 9.2 |
| Fatty acids (expressed as stearic acid) _____per cent__ | 1.32 |
| Esters (expressed as stearyl stearate) _____do____ | 13.72 |
| Alcohols (expressed as stearyl alcohol) _____do____ | 80.60 |

The foregoing illustrates the practice of this invention, which however, is not to be limited thereby but is to be construed as broadly as permissible in view of the prior art and limited solely by the appended claims.

I claim:

1. The process of making catalysts, which comprises forming a flowable homogeneous mixture consisting essentially of from about 1 to about 3 mols of chromium trioxide and from about 1 to about 2 mols of at least one acetate of a metal selected from zinc, copper and cadmium and mixtures thereof, and decomposing said mixture by heating at about 95° to 300° C.

2. The process of claim 1, wherein the metal acetate employed is zinc acetate.

3. The process of claim 1, wherein the metal acetates employed are cupric acetate and zinc acetate, and said flowable homogeneous mixture also contains glacial acetic acid in an amount equal to about 2.6 parts per weight of said acid to 80 parts by weight of the total mixture.

4. The process of claim 1, wherein the metal acetates employed are cupric acetate and zinc acetate, and said flowable homogeneous mixture also contains a minor amount of cadmium carbonate in an amount equal to about 3 parts by weight of cadmium carbonate to 78 parts by weight of the total mixture.

5. The process of claim 1, wherein the metal acetate employed is cupric acetate, and the said flowable homogeneous mixture also contains glacial acetic acid in an amount equal to about 10.5 parts by weight of said acid to 86 parts by weight of the total mixture.

6. The process of claim 1, wherein the resulting catalyst is lixiviated with an aqueous solution of ammonium hydroxide and ammonium nitrate.

7. The process of claim 1, wherein the resulting catalysts are subjected to the action of hydrogen gas for 3 hours at about 390° C.

8. The process of claim 2, wherein the resulting catalyst is lixiviated with an aqueous solution of ammonium hydroxide and ammonium nitrate.

9. The process of claim 4, wherein the product of said claim is subjected to the action of hydrogen gas for 3 hours at about 390° C.

10. The process of claim 3, wherein the amounts employed are about 25 parts by weight of chromium trioxide, about 25 parts by weight of cupric acetate, about 27.5 parts by weight of zinc acetate and about 2.6 parts by weight of glacial acetic acid, and wherein the ingredients are decomposed at about 235° C.

11. The process of claim 3, wherein the resulting catalyst is lixiviated with an aqueous solution of ammonium hydroxide and ammonium nitrate.

12. The process of claim 3, wherein the product of said claim is subjected to the action of hydrogen gas for 3 hours at about 390° C.

13. The process of claim 4, wherein the amounts employed are about 25 parts by weight of chromium trioxide, about 45.5 parts by weight of zinc acetate, about 3.22 parts by weight of cadmium carbonate, and about 4.95 parts by weight cupric acetate, and wherein the ingredients are decomposed at about 250° C.

14. The process of claim 4, wherein the resulting catalyst is lixiviated with an aqueous solution of ammonium hydroxide and ammonium nitrate.

15. The process of claim 4, wherein the product of said claim is subjected to the action of hydrogen gas for 3 hours at about 390° C.

16. The process of claim 5, wherein the amounts employed are about 25 parts by weight of chromium trioxide, about 50 parts by weight of cupric acetate, and about 10.5 parts by weight of glacial acetic acid, and wherein the ingredients are decomposed at about 250° C.

17. The process of claim 6, wherein the product of said claim is subjected to the action of hydrogen gas for 3 hours at about 390° C.

ALFRED F. KAPECKI.

REFERENCES CITED

The following references are of record in the file of this patent:

UNITED STATES PATENTS

| Number | Name | Date |
|---|---|---|
| 1,746,781 | Lazier | Feb. 11, 1930 |
| 1,746,782 | Lazier | Feb. 11, 1930 |
| 1,809,978 | Larson | June 16, 1931 |
| 1,964,001 | Lazier | June 26, 1934 |
| 2,089,133 | Salzberg | Aug. 10, 1937 |
| 2,193,464 | Natta | Mar. 12, 1940 |
| 2,205,141 | Heard | June 18, 1940 |
| 2,211,302 | Turkevich | Aug. 13, 1940 |
| 2,344,318 | Mattox | Mar. 14, 1944 |
| 2,385,609 | Clark | Sept. 25, 1945 |

OTHER REFERENCES

Mellor's Mod. Inorg. Chem., page 772. Published by Longman's, 1939.